(12) United States Patent
Eguchi et al.

(10) Patent No.: US 9,419,434 B2
(45) Date of Patent: Aug. 16, 2016

(54) POWER SWITCHING APPARATUS, POWER SUPPLY UNIT, AND COMPUTER SYSTEM

(71) Applicants: FUJITSU LIMITED, Kawasaki-shi, Kanagawa (JP); FUJITSU ADVANCED ENGINEERING LIMITED, Shinjuku-ku, Tokyo (JP)

(72) Inventors: Susumu Eguchi, Kawasaki (JP); Takahiro Kamei, Kawasaki (JP)

(73) Assignees: FUJITSU LIMITED, Kawasaki (JP); FUJITSU ADVANCED ENGINEERING LIMITED, Tokyo (JP)

( * ) Notice: Subject to any disclaimer, the term of this patent is extended or adjusted under 35 U.S.C. 154(b) by 203 days.

(21) Appl. No.: 14/254,382

(22) Filed: Apr. 16, 2014

(65) Prior Publication Data

US 2014/0225438 A1  Aug. 14, 2014

Related U.S. Application Data

(63) Continuation of application No. PCT/JP2011/075229, filed on Nov. 1, 2011.

(51) Int. Cl.
*H02J 3/38* (2006.01)
*H02J 9/00* (2006.01)
(Continued)

(52) U.S. Cl.
CPC ... *H02J 1/00* (2013.01); *G06F 1/26* (2013.01); *G06F 1/3203* (2013.01); *Y10T 307/344* (2015.04); *Y10T 307/696* (2015.04)

(58) Field of Classification Search
CPC ............ G06F 1/26; G06F 1/3203; H02J 1/00; Y10T 307/344; Y10T 307/696
USPC .......................................................... 307/23
See application file for complete search history.

(56) References Cited

U.S. PATENT DOCUMENTS

| 2002/0171295 | A1* | 11/2002 | Nitta | G06F 1/28 307/64 |
| 2007/0222284 | A1* | 9/2007 | Matsubara | B60T 8/885 303/122.04 |
| 2012/0096294 | A1* | 4/2012 | Senba | G06F 1/263 713/323 |

FOREIGN PATENT DOCUMENTS

| JP | 2-155012 | 6/1990 |
| JP | 5-189096 | 7/1993 |

(Continued)

OTHER PUBLICATIONS

International Search Report mailed Jan. 24, 2012 in corresponding International Patent Application No. PCT/JP2011/075229.

(Continued)

*Primary Examiner* — Rexford Barnie
*Assistant Examiner* — Toan Vu
(74) *Attorney, Agent, or Firm* — Staas & Halsey LLP

(57) ABSTRACT

A power switching apparatus includes: a first input terminal to which first power is supplied; a second input terminal to which second power is supplied, the second power having a voltage that is lower than a voltage that the first power has; a first output terminal to supply to an outside the first power supplied to the first input terminal; and a second output terminal to supply to the outside the second power supplied to the second input terminal. First switching means manages the supplying of the second power from the first input terminal to the second output terminal. Second switching means manages the supplying of the second power from the second input terminal to the second output terminal. A processor manages the supplies of the first power and the second power using the first and second switching means.

5 Claims, 11 Drawing Sheets

(51) Int. Cl.
*H02J 1/00* (2006.01)
*G06F 1/26* (2006.01)
*G06F 1/32* (2006.01)

(56) References Cited

FOREIGN PATENT DOCUMENTS

| JP | 6-12876 | 1/1994 |
| JP | 7-123719 | 5/1995 |
| JP | 2001-258256 | 9/2001 |
| JP | 2002-101558 | 4/2002 |
| JP | 2002-149287 | 5/2002 |
| JP | 2007-47867 | 2/2007 |
| JP | 2010-15416 | 1/2010 |

OTHER PUBLICATIONS

PCT International Preliminary Report on Patentability issued May 15, 2014 in corresponding International Application No. PCT/JP2011/075229.

Office Action dated Feb. 17, 2015 in corresponding Japanese Patent Application No. 2013-541521.

* cited by examiner

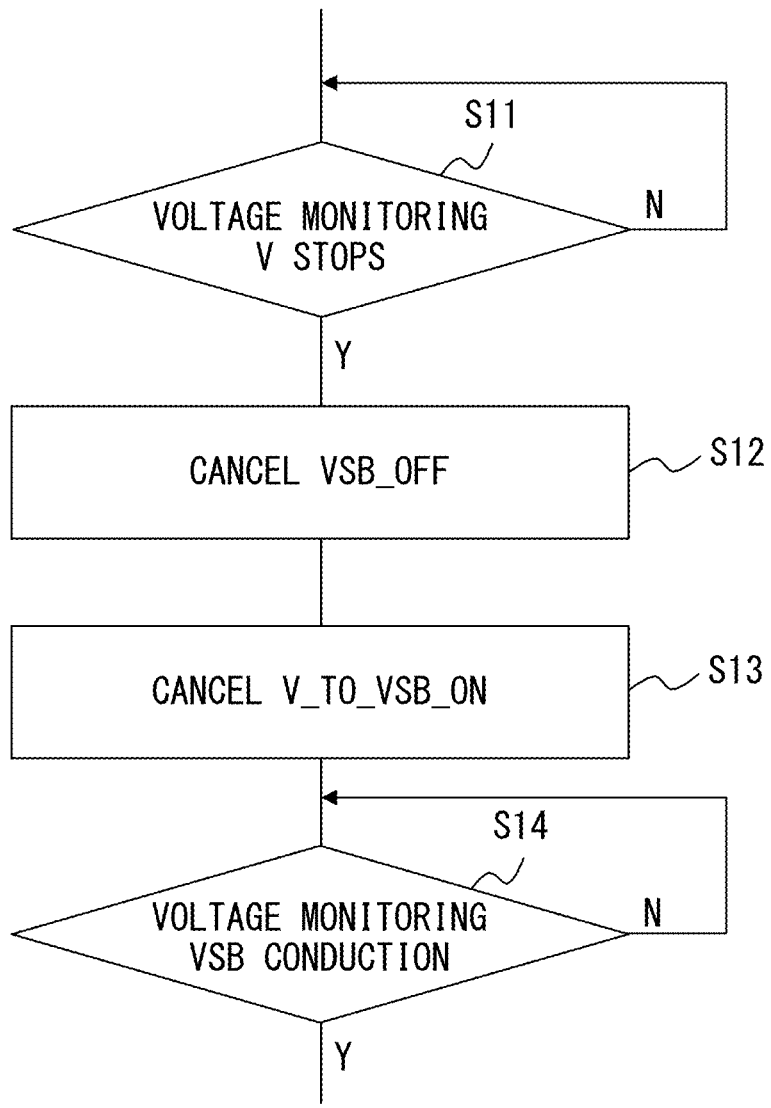
F I G. 6

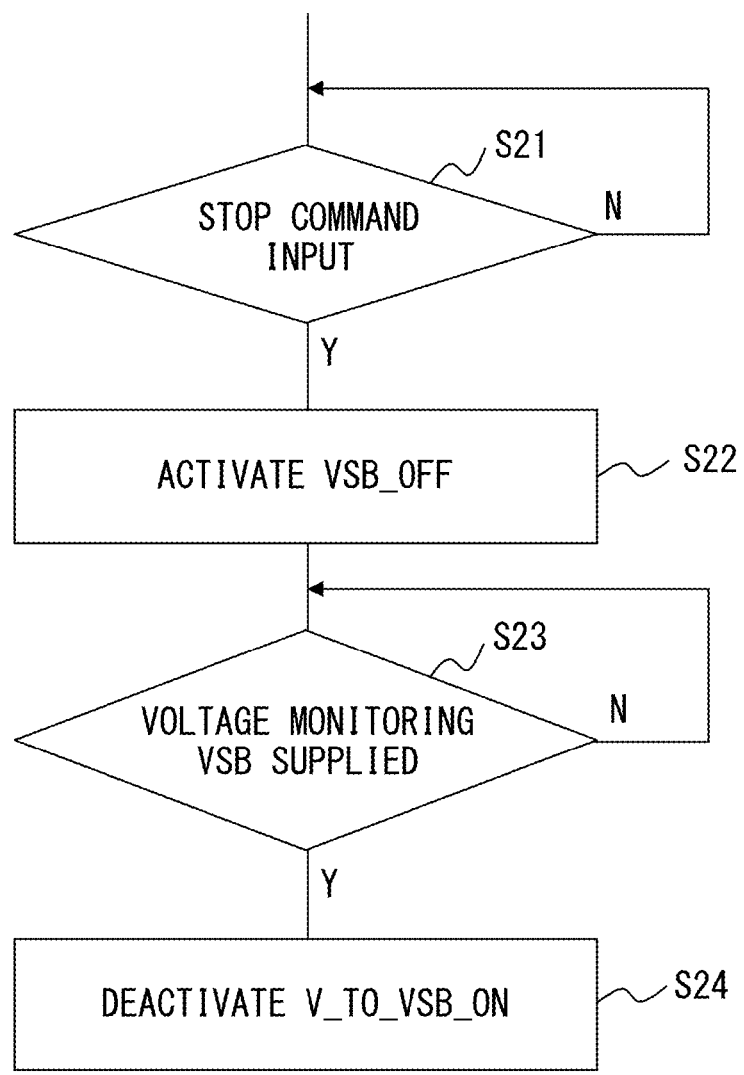
F I G. 9

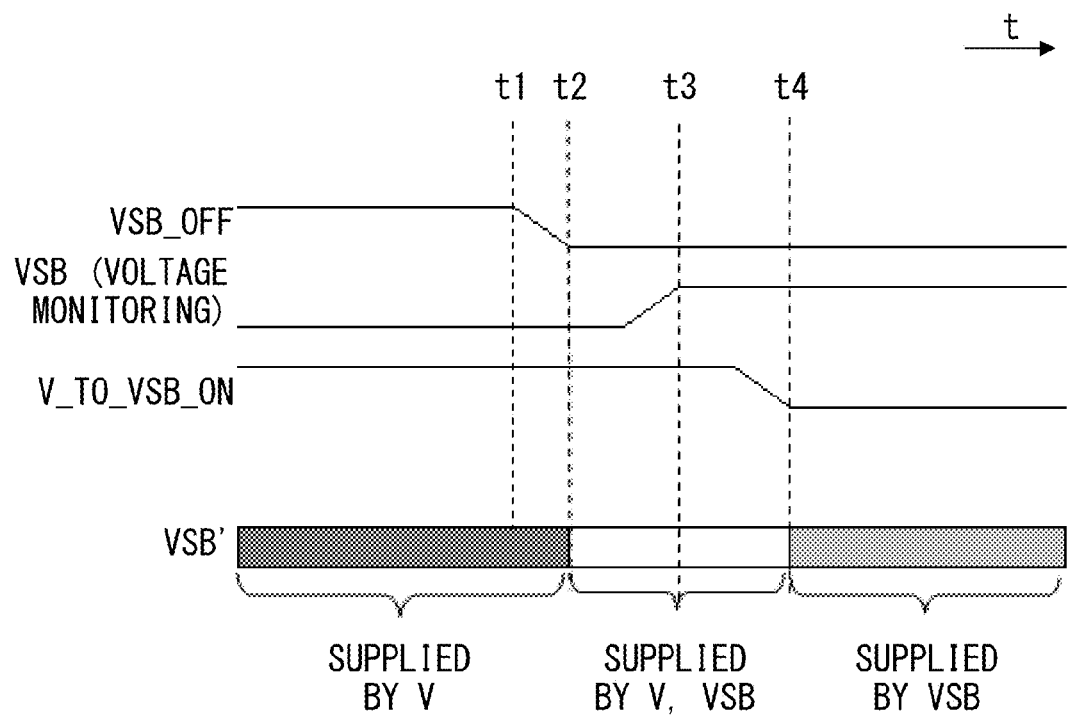
F I G. 10

POWER SWITCHING APPARATUS, POWER SUPPLY UNIT, AND COMPUTER SYSTEM

CROSS-REFERENCE TO RELATED APPLICATION

This application is a continuation application of International Application PCT/JP2011/075229 filed on Nov. 1, 2011 and designated U.S., the entire contents of which are incorporated herein by reference.

FIELD

The embodiments discussed herein are related to a technology for controlling a power supplied by a power supply unit.

BACKGROUND

In recent years, computers used for, for example, servers have been mounted with a management unit directed to, for example, condition monitoring, configuration-information displaying, or error-information displaying for hardware. For a computer that is in a stand-by state, the management unit performs system checks on various pieces of hardware, e.g., a CPU (Central Processing Unit), a memory, a fan, and an IO (Input/Output) apparatus. The management unit controls power activation performed by a power supply unit (PSU) in the shifting of a computer from a stand-by state to an in-operation state, and controls power deactivation performed by the PSU in the shifting of the computer from the in-operation state to the stand-by state. In this way, the management unit is operated for both the stand-by state and the in-operation state of the computer. Accordingly, as a PSU for a computer with a management unit, a PSU that includes a dual-system power conversion circuit capable of always supplying power to the management unit and supplying power to each piece of hardware of the computer on an as-needed basis is typically used.

FIG. 1 illustrates a power supply to a computer performed by a conventional PSU.

A PSU 1 in FIG. 1 may supply power to a computer 10 that includes a management unit 16 and various pieces of hardware such as a CPU 11, a memory module (indicated as a "DIMM" (Dual Inline Memory Module) in FIG. 1) 12, an IO apparatus 13, a fan 14, and a disk apparatus 15. The PSU 1 includes two power conversion circuits 2 and 3 intended for different voltages so that power can be supplied to the various pieces of hardware 11-15 on an as-needed basis and so that power can always be supplied to the management unit 16. The power conversion circuits 2 and 3 convert AC power supplied from outside via an outlet 4 into DC power. "V" and "VSB" in FIG. 1 indicate power supplied from the power conversion circuits 2 and 3, respectively.

The configuration of the computer depicted in FIG. 1 is an example, and the configuration of the computer is not limited to the one in FIG. 1. FIG. 1 indicates that power V and power VSB are directly supplied to the various pieces of hardware 11-15 and the management unit 16, respectively, but, in many cases, a DC-DC converter (hereinafter referred to as a "DDC") is prepared for each piece of hardware. Hence, power is supplied to each of the pieces of hardware 11-15 via a corresponding DDC.

The power conversion circuit 3 is a resident power supply that always generates power VSB in a situation in which AC power is supplied. The power conversion circuit 2 is a non-resident power supply for which the management unit 16 controls the supply of AC power. The power conversion circuit 2 is controlled to supply power V to each part of the computer 10 when the computer 10 is in an in-operation state and to not supply power V when the computer 10 is in a stand-by state.

In recent years, many data centers have been established in which many computers are set up as servers. Many CPUs have been installed in a computer, thereby advancing CPU speeding up. With CPU speeding up, the actual situation is that cooling devices such as fans have become indispensable. Hence, power consumption per computer has tended to increase. Accordingly, a huge power is generally consumed at data centers where many computers are set up.

A PSU that supplies power to a computer also consumes power. Due to increased power consumption by computers, power consumption by the PSU is becoming not negligible. This means that consideration needs to be taken to suppress power consumption by PSUs, which are widely used to supply power to a computer.

PRIOR ART DOCUMENT

Patent Document

Patent document 1: Japanese Laid-open Patent Publication No. 2001-258256

SUMMARY

According to an aspect of the embodiments, a power switching apparatus includes: a first input terminal to which first power is supplied; a second input terminal to which second power is supplied, the second power having a voltage that is lower than a voltage that the first power has; a first output terminal to supply to an outside the first power supplied to the first input terminal; a second output terminal to supply to the outside the second power supplied to the second input terminal; first switching means for managing the supplying of the second power from the first input terminal to the second output terminal; second switching means for managing the supplying of the second power from the second input terminal to the second output terminal; and a processor that manages the supplies of the first power and the second power using the first and second switching means.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a flowchart illustrating a process performed by a system controller to deal with the stopping of the supply of power V (second embodiment).

FIG. 9 is a flowchart illustrating a process performed by an FPGA to deal with the stopping of the supply of power V (third embodiment).

FIG. 10 is a timing chart illustrating operations performed by an FPGA when the supply of power V stops (third embodiment).

DESCRIPTION OF EMBODIMENTS

The following will describe embodiments of the present invention in detail with reference to the drawings.

First Embodiment

Figure 1:
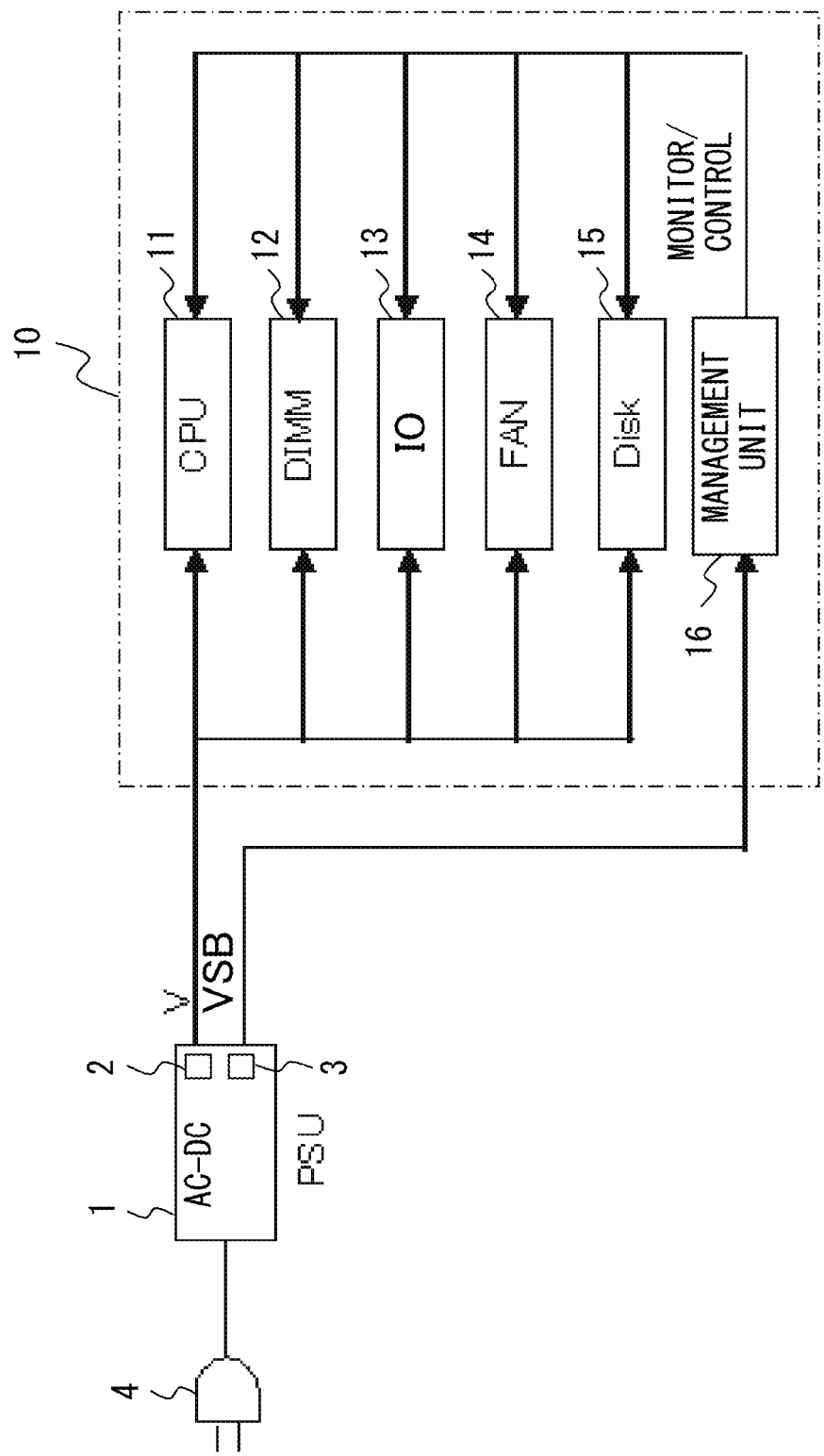
FIG. 1 illustrates a power supply to a computer performed by a conventional PSU.
Figure 2A:
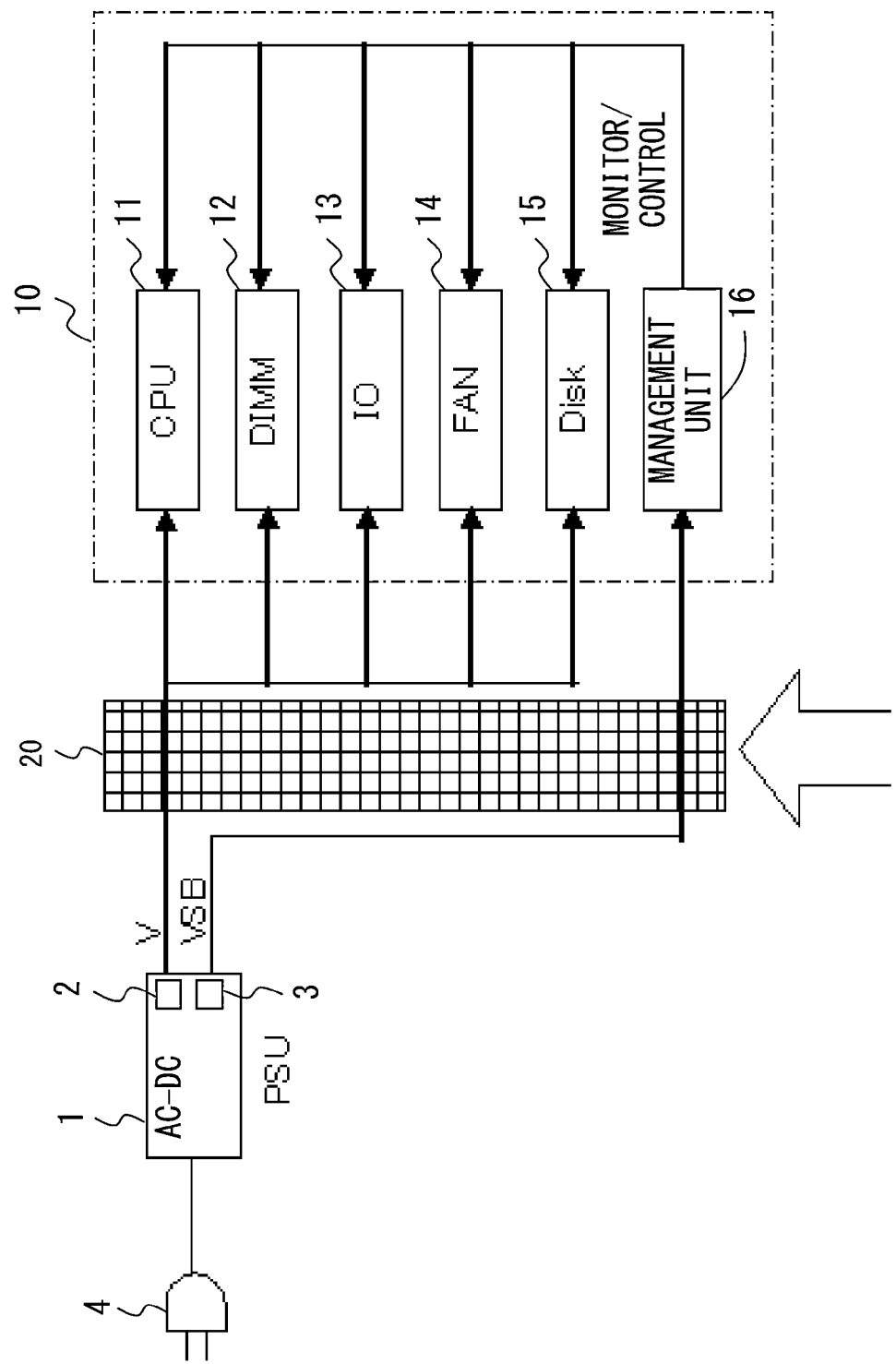
FIGS. 2A and 2B illustrate the circuit configuration of a power switching apparatus and a method for using the power switching apparatus in accordance with a first embodiment.
Figure 2B:
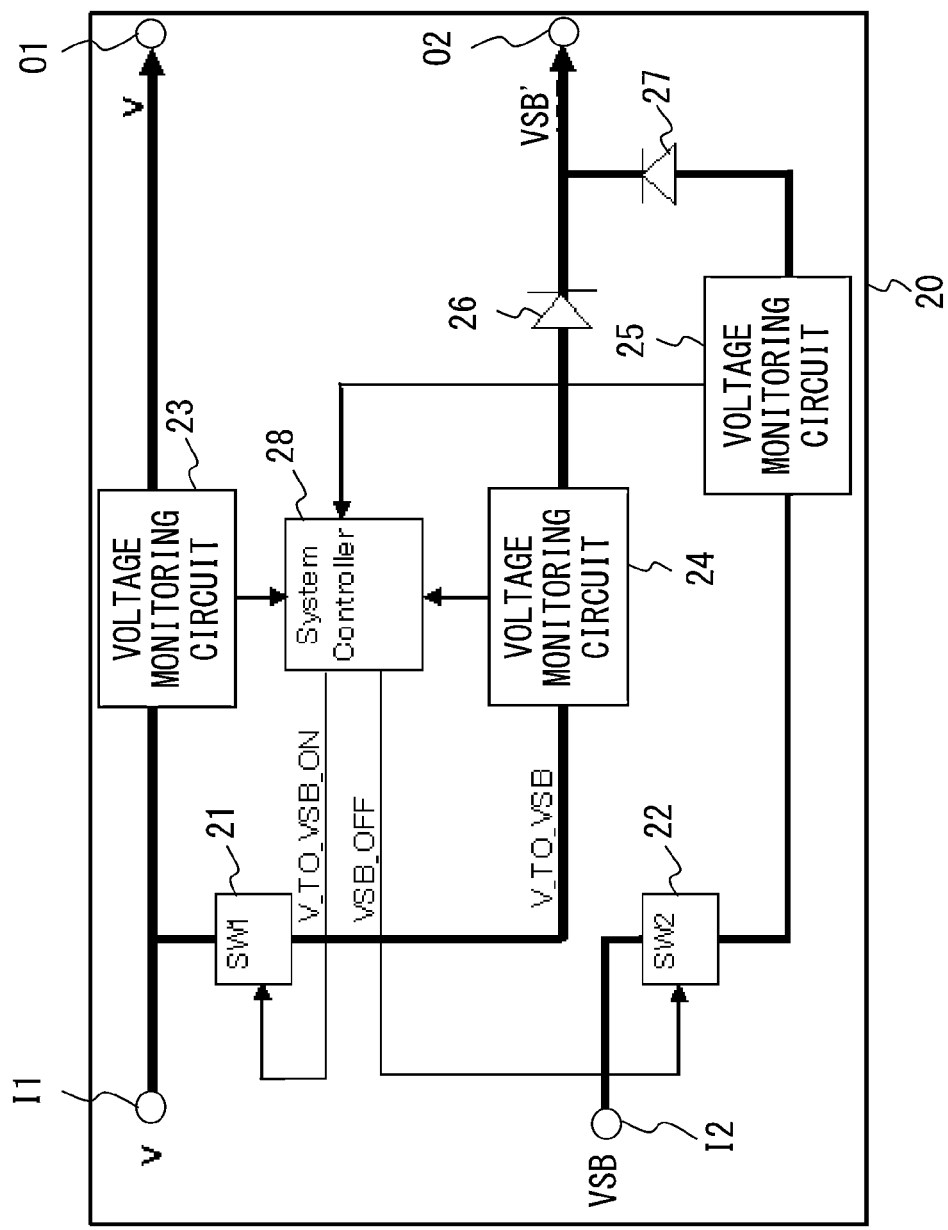

FIGS. 2A and 2B depict the circuit configuration of a power switching apparatus in accordance with a first embodiment. In FIGS. 2A and 2B, elements that are essentially the same as those in FIG. 1 are indicated using the marks used in FIG. 1. Accordingly, the following descriptions will focus only on a power switching apparatus 20.

As illustrated in FIGS. 2A and 2B, the power switching apparatus 20 in accordance with the embodiment is positioned between a PSU 1 and a computer 10. Power V output from a power conversion circuit 2 of the PSU 1 is supplied to an input terminal I1, and power VSB output from the power conversion circuit 3 is supplied to an input terminal I2.

A switching element 22 is connected to one side of the input terminal I2, and a voltage monitoring circuit 25 is connected to an opposite side of the switching element 22, and an anode-side of a diode 27 is connected to the voltage monitoring circuit 25. A cathode-side of the diode 27 is connected to an output terminal O2. The switching element 22 may manage outputting, to the output terminal O2, power VSB supplied to the input terminal I2. The voltage monitoring circuit 25, which outputs a signal that depends on an applied voltage, is used to monitor the supply of power VSB provided via the switching element 22.

One side of a switching element 21 and a voltage monitoring circuit 23 are connected to the input terminal I1. A voltage monitoring circuit 24 is connected to an opposite side of the switching element 21, and an anode-side of a diode 26 is connected to the voltage monitoring circuit 24. A cathode-side of the diode 26 is connected to the output terminal O2. The switching element 21 may manage outputting, to the output terminal O2, power V supplied to the input terminal I1. The voltage monitoring circuits 23 and 24 are identical with, for example, the voltage monitoring circuit 25. The voltage monitoring circuit 23 is used to monitor the supply of power V provided via the input terminal I1. The voltage monitoring circuit 24 is used to monitor the supply of power V provided via the switching element 21 (V_TO_VSB). "V_TO_VSB" in FIG. 4 indicates power output via the switching element 21. "VSB'" indicates power supplied from the output terminal O2 to the outside.

The aforementioned configuration allows the power switching apparatus 20 to output, to the output terminal O2, power V supplied to the input terminal I1 in addition to outputting, to the output terminal O2, power VSB supplied to the input terminal I2. In a situation in which power V is not supplied to the input terminal I1, the power switching apparatus 20 causes power VSB supplied to the input terminal I2 to be output from the output terminal O2. Meanwhile, in a situation in which power V is supplied to the input terminal I1, the power switching apparatus 20 causes power V (V_TO_VSB) supplied to the input terminal I1 to be output from the output terminal O2 without causing power VSB supplied to the input terminal I2 to be output to the output terminal O2. In this manner, in accordance with whether power V is supplied, the power switching apparatus 20 switches between power V and power VSB for power to be supplied from the output terminal O2.

Signals output by the voltage monitoring circuits 23-25 are input to a system controller 28. The system controller 28 refers for these signals and performs switching control on the switching elements 21 and 22 to select and switch power supplied from the output terminal O2. The switching control on the system controller 28 turns ON or OFF the switching elements 21 and 22, and, in accordance with the ON or OFF state, power is conducted or interrupted. "V_TO_VSB_ON" and "VSB_OFF" in FIG. 2B respectively indicate drive signals output to the switching elements 21 and 22 from the system controller 28. "V_TO_VSB_ON" is a signal that instructs the switching element 21 to output V_TO_VSB, and "VSB_OFF" is a signal that instructs the switching element 22 to stop the output of VSB.

Figure 3:
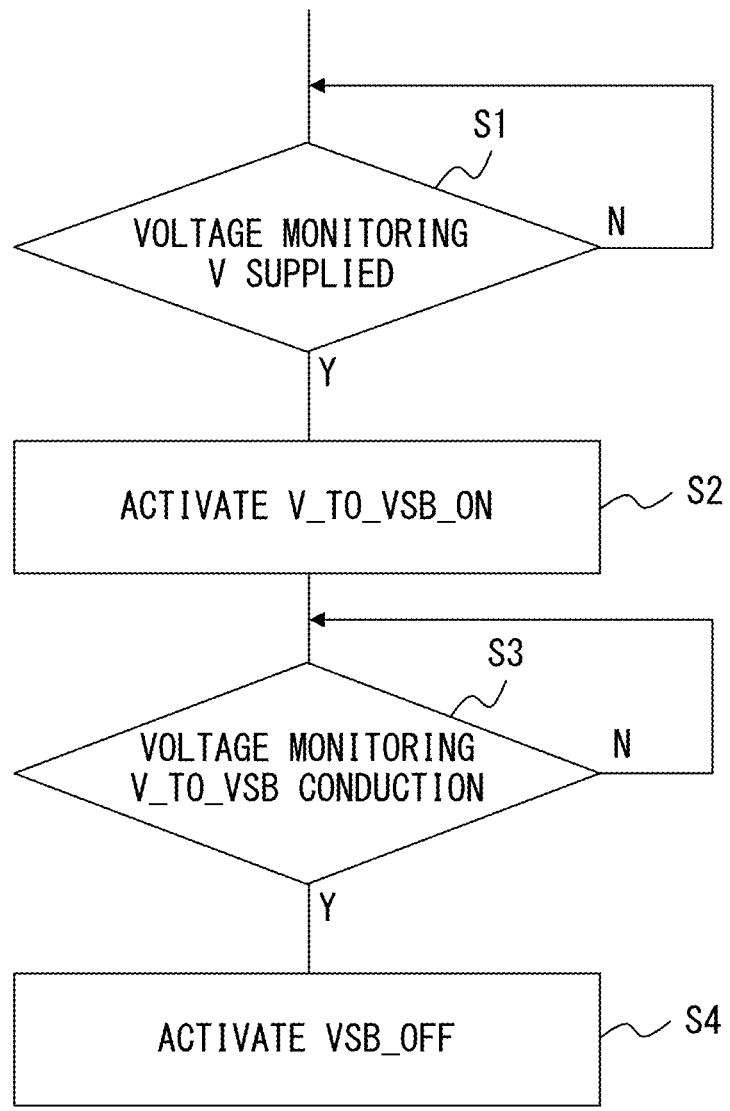
FIG. 3 is a flowchart illustrating a process performed by a system controller to deal with the starting of the supply of power V. (first embodiment)
Figure 4:
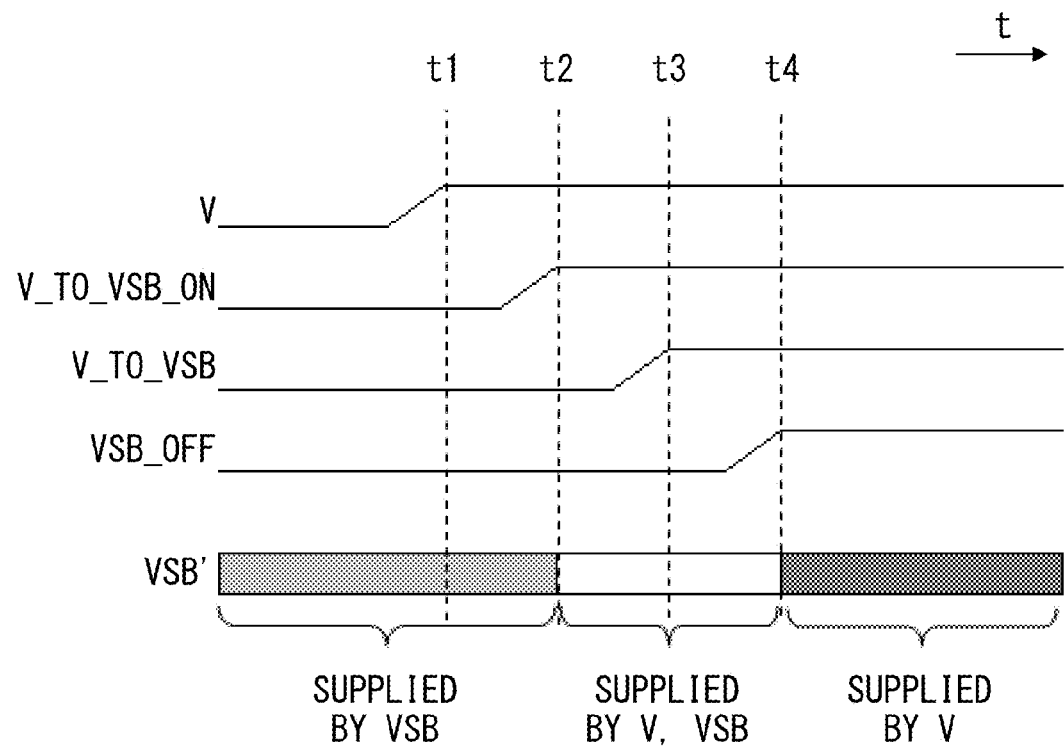
FIG. 4 is a timing chart illustrating operations performed by a system controller when the supply of power V starts. (first embodiment)

The switching control is performed in a manner described hereinafter. With reference to FIGS. 3 and 4, the switching control on the switching elements will be described in detail. FIG. 3 is a flowchart illustrating a process performed by the system controller 28 to deal with the supply of power V. FIG. 4 is a timing chart illustrating operations performed by the system controller 28 when the supply of power V starts. To describe operations performed by the system controller 28, FIG. 4 depicts temporal changes in driving signals V_TO_VSB_ON and VSB_OFF supplied to the switching elements 21 and 22, results of monitoring by the voltage monitoring circuits 23 and 24, and power VSB' output to the output terminal O2. In the example of FIG. 4, when the driving signal V_TO_VSB_ON is at an H (High) level (hereinafter simply referred to as "H"), the driving signal V_TO_VSB_ON becomes active and turns ON the switching element 21, i.e., puts the switching element 21 in a conduction state; when the driving signal VSB_OFF is at H, the driving signal VSB_OFF becomes active and turns OFF the switching element 22, i.e., interrupts the switching element 22. Results of power-supplying monitoring performed by the voltage monitoring circuits 23 and 24 are indicated as power V and power V_TO_VSB in FIG. 4.

In a situation in which power V is not supplied to the power switching apparatus 20, in response to a power-supplying monitoring result from the voltage monitoring circuit 23, the system controller 28 makes the driving signal V_TO_VSB_ON and the driving signal VSB_OFF inactive, i.e., sets these driving signals to an L (Low) level (hereinafter simply referred to as "L"). Hence, the switching element 22 is put in a conduction state, causing power VSB supplied to the input terminal I2 to be output to the output terminal O2 as VSB'. In such a situation, the system controller 28 monitors signals input from the voltage monitoring circuit 23 and waits for a voltage V to be supplied to the power switching apparatus 20 via the input terminal I1 (S1 in FIG. 3). When a signal input from the voltage monitoring circuit 23 changes to a value indicating the supply of power V (YES in S1 in FIG. 3; timing t1 in FIG. 4), the system controller 28 makes the driving signal V_TO_VSB_ON active (S2 in FIG. 3; timing t2 in FIG.

4). Then, the system controller 28 waits for a signal output by the voltage monitoring circuit 24 to change to a value indicating conduction of power V_TO_VSB (S3 in FIG. 3).

Making the driving signal V_TO_VSB_ON active changes the signal level thereof from L to H (timing t2 in FIG. 4), thereby turning ON the switching element 21, with the result that power V is conducted as V_TO_VSB. Consequently, V_TO_VSB is supplied to the voltage monitoring circuit 24 via the switching element 21, and the signal output by the voltage monitoring circuit 24 becomes a value indicating the conduction of power V_TO_VSB (YES in S3 in FIG. 3; timing t3 in FIG. 4). In addition to power VSB, power V becomes a source of power VSB' supplied to the output terminal O2.

When the signal output by the voltage monitoring circuit 24 becomes a value indicating the supply of V_TO_VSB, the system controller 28 makes the driving signal VSB_OFF active (S4 in FIG. 3). Making the driving signal VSB_OFF active changes the signal level thereof from L to H (timing t4 in FIG. 4), thereby turning OFF the switching element 22, with the result that the output of power VSB is interrupted. Consequently, the power VSB', which has been supplied to the output terminal O2 by both power VSB and power V, becames to be supplied to the output terminal O2 by only power V (V_TO_VSB). Then, the switching control performed by the system controller 28 ends.

As described above, the system controller 28 refers to results of monitoring by the voltage monitoring circuits 23 and 24, autonomously deals with the starting of the supply of power V, and performs switching control on power supplied to the output terminal O2. Providing the power switching apparatus 20 eliminates the need to cause the computer 10 or another apparatus to perform some control.

Until the supply of power V stops, power V (V_TO_VSB) is the only source of power VSB' output to the output terminal O2. Hence, the amount of power consumed to supply power VSB' is basically equal to the amount of power consumed by the power conversion circuit 2.

When recognizing the stopping of the supply of power V in response to a signal from the voltage monitoring circuit 23, the system controller 28 makes the driving signals V_TO_VSB_ON and VSB_OFF inactive. Consequently, the switching element 21 is turned OFF, thereby interrupting the output of power V_TO_VSB, and the switching element 22 is turned ON, thereby conducting power VSB.

Power conversion efficiency, which depends on a consumed current (load current), tends to become lower as the consumed current becomes smaller. The load of the management unit 16 is ordinarily very small in comparison with the total loads of the pieces of hardware 11-15, i.e., the elements to which power V is supplied. Accordingly, the power conversion circuit 3 has a conversion efficiency that is lower than that of the power conversion circuit 2.

The management unit 16 is a data processing apparatus that includes pieces of hardware such as a CPU, an I/O apparatus, and an FPGA (Field Programmable Gate Array) (none of which are illustrated). These pieces of hardware have tended to be highly functional and to have a high performance, and hence the power consumption by the management unit 16 has tended to increase. Accordingly, a low conversion efficiency of the power conversion circuit 3 is not negligible problem.

While power V is being supplied, power V may be supplied to the management unit 16 instead of power VSB, thereby minimizing the power consumed by the power conversion circuit 3 to supply power VSB. The power consumed by the power conversion circuit 2 to supply power V does not greatly increase even when this power is used to supply power to the management unit 16. Hence, supplying power V instead of power VSB may suppress the power consumption by the PSU 1 more effectively.

Assume that the PSU 1 includes, for example, the power conversion circuits 2 and 3, each meeting the following specifications.

Power conversion circuit 2
Output voltage: 12V
Maximum value of consumed (supplied) current: 62.5 A
Conversion efficiency η: 90%
Power conversion circuit 3
Output voltage: 5V
Maximum value of consumed (supplied) current: 4 A
Conversion efficiency η: 50%

Assume that a DDC used to convert power V (12V) into power VSB (5V) for supplying power V (12V) to the management unit 16 has a conversion efficiency of η=90%.

In the PSU 1 that meets the aforementioned specifications, the value of power consumed by the power conversion circuit 3 is as follows, on the assumption that the current supplied from the power conversion circuit 3 indicates the maximum value.

$$\text{Value of consumed power} = 4\,A \times 5V \times 1.5\,(\eta=50\%) = 30\,W$$

In the supplying of power V to the output terminal O2 instead of power VSB, the value of the power consumed by the power conversion circuit 2, including the power consumed by the DDC to convert power V (12V) into power VSB (5V), is calculated as follows.

$$\text{Value of consumed power} = 4\,A \times 5V \times 1.1\,(\text{power conversion circuit 2: }\eta=90\%) \times 1.1\,(DDC: \eta=90\%) = 24.2\,W$$

The value of the power consumed within the power conversion circuit 3 to supply power VSB is as follows.

$$\text{Value of consumed power} = 0.1\,A \times 5V \times 1.5\,(\eta=50\%) = 0.75\,W$$

Hence, when power is supplied from only the power conversion circuit 2, the value of total consumed power is 24.95 (=24.2+0.75) W. Accordingly, in comparison with a situation in which power VSB is directly supplied to the output terminal O2, power consumption decreases by 16.8% (=1−(24.95 W/30 W)·100).

The embodiment is directed to, but not limited to, the PSU 1 that includes the two systems, i.e., the power conversion circuits 2 and 3. As long as the PSU includes one or more power conversion circuits directed to use as resident power supplies and one or more power conversion circuits directed to use as non-resident power supplies, the embodiment is widely applicable irrespective of the use thereof. Power V, instead of power VSB, may be supplied to the PSU 1, and then the supply of power VSB by the power conversion circuit 3 may be stopped.

In the embodiment, the voltage monitoring circuits 24 and 25 monitor power (voltage) supplied via the switching elements 21 and 22, but monitoring by the voltage monitoring circuits 24 and 25 is omissible. That is, in view of results of monitoring by the voltage monitoring circuit 23, the system controller 28 may perform switching control under the sequence illustrated in FIG. 4.

Second Embodiment

Figure 5:
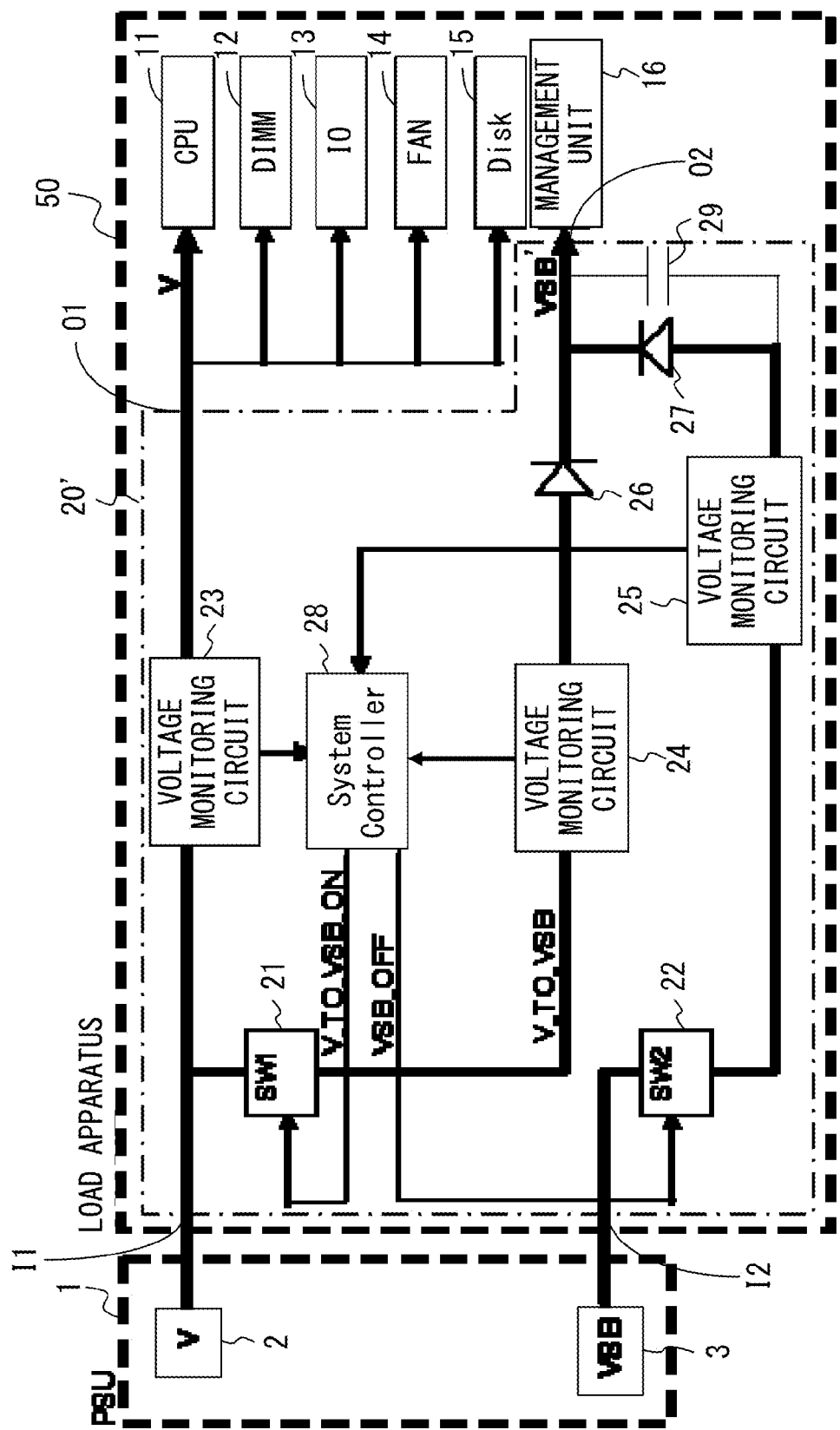
FIG. 5 illustrates the circuit configuration of a power switching apparatus and a method for applying the power switching apparatus in accordance with a second embodiment.

FIG. 5 illustrates the circuit configuration of a power switching apparatus in accordance with a second embodiment. In FIG. 5, elements that are essentially the same as those in FIG. 2B are indicated using the marks used in FIG. 2B. Accordingly, the following descriptions focus only on portions that are different from those in the first embodiment.

As illustrated in FIG. 5, a power switching apparatus 20' in accordance with the embodiment is embedded in a load apparatus 50 to which power is supplied from the PSU 1. The load apparatus 50 is a computer used as, for example, a server.

In the first embodiment, when the supply of power V stops, the system controller 28 recognizes the stopping of the supply of power V by, for example, a signal input from the voltage monitoring circuit 23 and makes the driving signals V_TO_VSB_ON and VSB_OFF inactive. However, even when the driving signal VSB_OFF is made to be inactive, it takes some time before power VSB is supplied to the output terminal O2 via the switching element 22. Hence, a situation may possibly occur in which no power is temporarily supplied to the management unit 16. The second embodiment ensures that power is supplied to the management unit 16 even while the supply of power V is being stopped.

In the second embodiment, a capacitor 29 is connected in parallel to the diode 27 to prevent the supply of power to the management unit 16 from stopping. The capacitor 29 accumulates charges while power is being supplied to the output terminal O2, and releases the charges when the supply of power to the output terminal O2 stops. Consequently, the capacitor 29 supplies power to the output terminal O2 while no power is being supplied to the output terminal O2 (during the period from the stopping of the supply of the power V to the starting of the supply of power VSB). When the supply of power V stops, the system controller 28 performs the following switching control. The following will describe the switching control in detail with reference to FIGS. 6 and 7.

Figure 7:
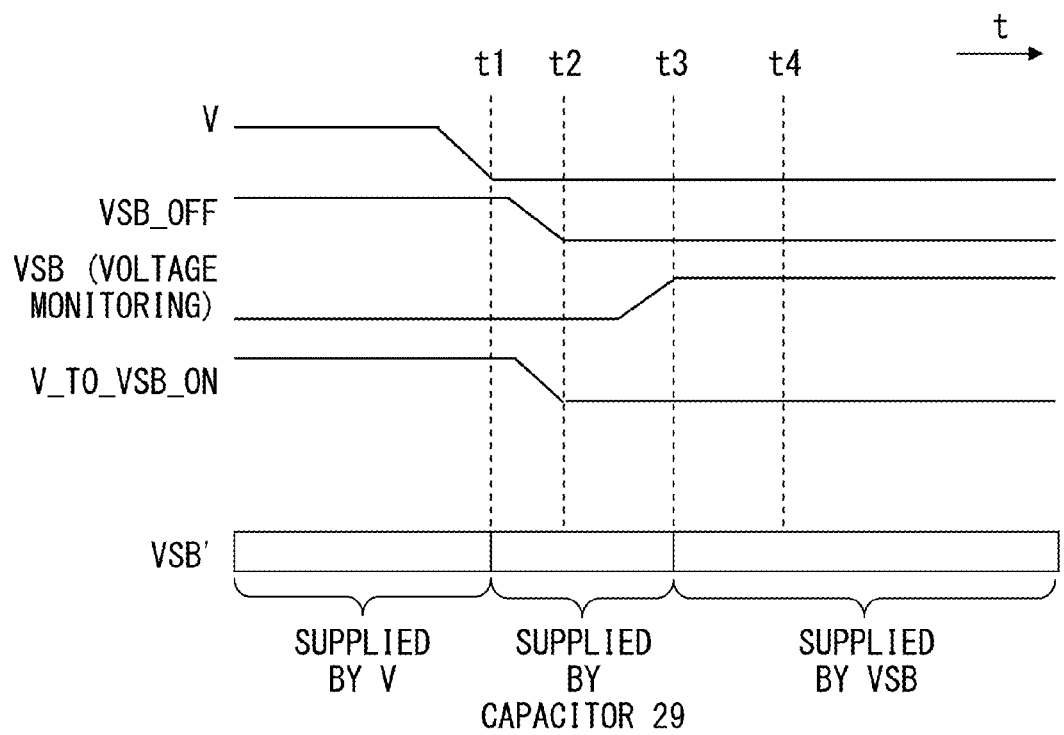
FIG. 7 is a timing chart illustrating operations performed by a system controller when the supply of power V stops (second embodiment).

FIG. 6 is a flowchart illustrating a process performed by the system controller 28 to deal with the stopping of the supply of power V. FIG. 7 is a timing chart illustrating operations performed by the system controller 28 when the supply of power V stops. To illustrate operations performed by the system controller 28, FIG. 7 depicts temporal changes in the driving signals V_TO_VSB_ON and VSB_OFF supplied to the switching elements 21 and 22, a result of the monitoring of voltage V by the voltage monitoring circuit 23, a result of the monitoring of voltage VSB by the voltage monitoring circuit 25, and the power VSB' supplied to the output terminal O2. The results of the monitoring by the voltage monitoring circuits 23 and 25 are respectively indicated as power V and power VSB in FIG. 7. The driving signal V_TO_VSB_ON in an active state (H) turns ON the switching element 21, and the driving signal VSB_OFF in an active state turns OFF the switching element 22.

While power V is being supplied to the power switching circuits, the system controller 28 makes both of the driving signals V_TO_VSB_ON and VSB_OFF active, causing the output terminal O2 to directly output power V supplied to the input terminal I1. In such a situation, the system controller 28 monitors the state of the supplying of voltage V performed via the input terminal I1 by monitoring a signal input from the voltage monitoring circuit 23 (S11 in FIG. 6). When the signal input from the voltage monitoring circuit 23 changes to a value indicating the stopping of the supply of power V (YES in S11 in FIG. 6; timing t1 in FIG. 7), the system controller 28 sequentially makes the driving signals VSB_OFF and V_TO_VSB_ON inactive (indicated as "cancel" in FIG. 6) (S12 and S13 in FIG. 6). After this, the source of power VSB' output from the output terminal O2 is switched from power V to the capacitor 29.

Making the driving signal V_TO_VSB_ON inactive changes the signal level thereof from H to L (timing t2 in FIG. 7) and turns OFF the switching element 21. Making the driving signal VSB_OFF inactive changes the signal level thereof from H to L (timing t2 in FIG. 7) and turns ON the switching element 22, thereby power VSB is conducted. Consequently, the voltage monitoring circuit 25 detects power VSB and outputs a signal of a value indicating the conduction of power VSB (timing t3 in FIG. 7). Hence, the source of power VSB' output from the output terminal O2 is switched from the capacitor 29 to power VSB.

After making the driving signal V_TO_VSB_ON inactive, the system controller 28 waits for the signal output by the voltage monitoring circuit 25, i.e., the signal indicating the supply of power VSB output via the switching element 22, to become a value indicating conduction of power VSB (S14 in FIG. 6). The switching control performed by the system controller 28 to deal with the stopping of the supply of power V ends when the supply of power VSB is confirmed via monitoring by the voltage monitoring circuit 25 (YES in S14 in FIG. 6).

As described above, the second embodiment ensures that power is supplied to the management unit 16 even just when the supply of power V is stopped. This may eliminate inconveniences that would occur when the supply of power to the management unit 16 temporarily stops. The switching control performed to deal with the starting of the supply of power V is identical with the one in the first embodiment and thus is not described herein.

The system controller 28 refers to results of monitoring by the voltage monitoring circuits 23 and 24, autonomously deals with the starting and stopping of the supply of power V, and performs switching control. Hence, as in the first embodiment, the load apparatus 50 that includes the power switching apparatus 20' or another apparatus does not need to perform any control.

Third Embodiment

Figure 8:
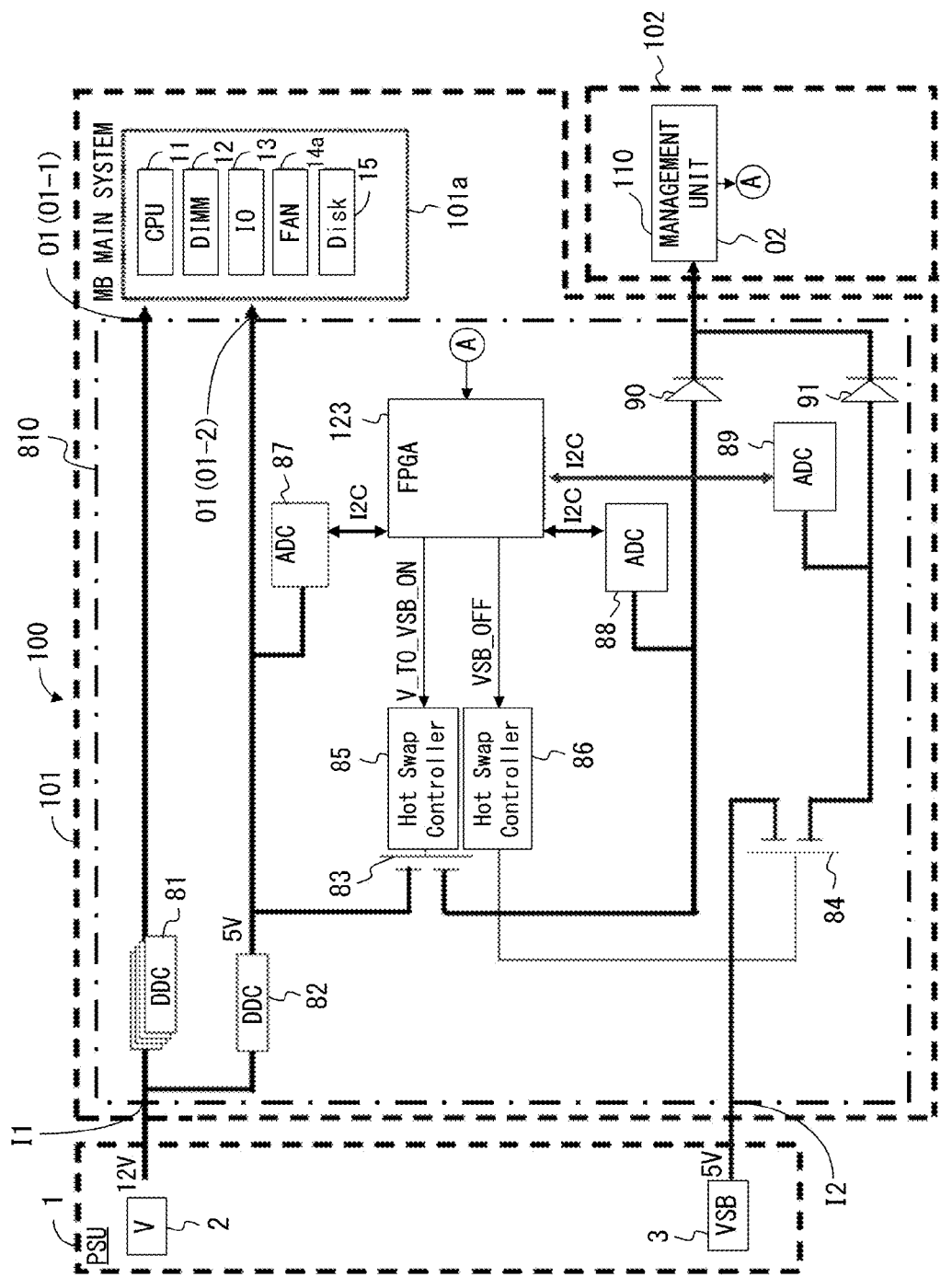
FIG. 8 illustrates the circuit configuration of a power switching apparatus and a method for applying the power switching apparatus in accordance with a third embodiment.

FIG. 8 illustrates the circuit configuration of a power switching apparatus in accordance with a third embodiment.

As illustrated in FIG. 8, a power switching apparatus 810 in accordance with the present embodiment is embedded in a load apparatus 100 to which power is supplied from the PSU 1, as in the second embodiment. The load apparatus 100 is a computer used as, for example, a server. The load apparatus 100 includes a motherboard (MB) 101 and a sub-board (SB) 102. On the motherboard 101, an MB main system block 101a is placed wherein the CPU 11, the memory module (DIMM) 12, the IO apparatus 13, a fan driving circuit 14a, and the disk apparatus 15 are implemented. A management unit 110 is implemented on the sub-board 102. The power switching apparatus 810 in accordance with the embodiment is implemented on the motherboard 101.

As illustrated in FIG. 8, the power switching apparatus 810 includes a DDC group 81 and a DDC 82, both connected to the input terminal I1. The DDC group 81 and the DDC 82 are conversion circuits to supply power in accordance with the pieces of hardware 11-15 of the MB main system block 101a.

In FIG. 8, power supplied from each DDC of the DDC group 81 is output to an output terminal O1-1, and power supplied from the DDC 82 is output to an output terminal O1-2. In practice, the DDCs of the DDC group 81 each supply power to a different output terminal O1. Note that the power switching apparatus 810 does not necessarily include the DDC group 81.

Power from the DDC 82 is also supplied to an ADC (Analog to Digital Converter) 87 and a drain of an N-channel MOSFET (Metal-Oxide Semiconductor Field-Effect Transistor) 83 (hereinafter referred to as an "NMOS"). The ADC 87 outputs to an FPGA 123 a signal indicating a value that depends on the voltage of power supplied from the DDC 82. The FPGA 123 is a controlling unit to control the entirety of a power switching apparatus 80.

A source of the NMOS 83 is connected to an ADC 88 and an anode of a diode 90, and a cathode of the diode 90 is connected to the output terminal O2. The NMOS 83 is used as a switching element for switching between conduction and interruption on a path between the DDC 82 and the output terminal O2. The ADC 88 outputs to the FPGA 123 a signal indicating a value that depends on the voltage of power supplied from the DDC 82 via the NMOS 83.

Meanwhile, a drain of an NMOS 84 is connected to the input terminal I2, and a source of the NMOS 84 is connected to an anode of a diode 91 and to an ADC 89. A cathode of the diode 91 is connected to the output terminal O2. The NMOS 84 is used as a switching element for switching between conduction and interruption on a path between the input terminal I2 and the output terminal O2. The ADC 89 outputs to the FPGA 123 a signal indicating a value that depends on the voltage of power VSB supplied via the NMOS 84.

The FPGA 123 is connected to hot swap controllers (hereinafter referred to as "HSCs") 85 and 86 to turn ON or OFF the NMOSs 83 and 84. The HSCs 85 and 86 are respectively connected to gates of the NMOSs 83 and 84. In accordance with the signal level of the driving signal V_TO_VSB_ON input from the FPGA 123, the HSC 85 changes the level of a signal output to the gate of the NMOS 83.

The level of the signal output from the HSC 85 to the gate of the NMOS 83 is H when the signal level of the driving signal V_TO_VSB_ON is H, and is L when the signal level of the driving signal V_TO_VSB_ON is L. The driving signal V_TO_VSB_ON becomes active when the signal level thereof is H, thereby turning ON the NMOS 83. Meanwhile, the level of the signal output from the HSC 86 to the gate of the NMOS 84 is L when the signal level of the driving signal VSB_OFF is L, and is H when the signal level of the driving signal VSB_OFF is H. The driving signal VSB_OFF becomes active when the signal level thereof is L, thereby turning ON the NMOS 84.

When a signal input from the ADC 87 indicates that the supply of power from the DDC 82 has stopped, the FPGA 123 makes the driving signal V_TO_VSB_ON inactive and the driving signal VSB_OFF active. This puts the NMOS 84 in a conduction state, thereby outputting, to the output termination O2, power VSB supplied via the input terminal I2. Subsequently, when the signal input from the ADC 87 indicates that power has been supplied from the DDC 82, the FPGA 123 makes the driving signal V_TO_VSB_ON active and then makes the driving signal VSB_OFF inactive. In this way, the FPGA 123 performs switching control similar to the switching control performed by the system controller 28 in accordance with the first embodiment (FIGS. 3 and 4). The driving signal VSB_OFF that is in the active state has a signal level of L, unlike the case in the first embodiment.

When the supply of power V from the power conversion circuit 2 has stopped, the supply of power VSB is interrupted on the assumption that power V has been supplied. Accordingly, the FPGA 123 performs the following switching control. The following will describe in detail the switching control performed by the FPGA 123 with reference to FIGS. 9 and 10. FIG. 9 is a flowchart illustrating a process performed by the FPGA 123 to deal with the stopping of the supply of power V. FIG. 10 is a timing chart illustrating operations performed by the FPGA 123 when the supply of power V stops. To illustrate operations performed by the FPGA 123, FIG. 10 depicts temporal changes in the driving signals V_TO_VSB_ON and VSB_OFF supplied to the HSCs 85 and 86, a result of the monitoring of the ADC 89, and power VSB' supplied to the output terminal O2. The result of the monitoring of the ADC 89 is indicated as power VSB in FIG. 10. When the power conversion circuit 2 supplies power V, the FPGA 123 makes the driving signal V_TO_VSB_ON active and the driving signal VSB_OFF inactive.

As with ordinary management units, the management unit 110 implemented on the sub board 102 controls power deactivation and power activation of the power conversion circuit 2 within the PSU 1. This fact is focused on in the third embodiment; an operator gives the management unit 110 an instruction to deactivate power to the power conversion circuit 2, and the management unit 110 instructs the FPGA 123 to perform power switching. The management unit 110 gives the power switching instruction at timings such that the voltage of power supplied from the DDC 82 does not become lower than a voltage for operations. The FPGA 123 performs switching control on that condition. The power switching instruction from the management unit 110 will hereinafter be referred to as a "stop command". The stop command may be output from, for example, a console used by the operator.

While the power conversion circuit 2 is supplying power V, the FPGA 123 waits for a stop command to be input from the management unit 110 (S21). When the stop command is input (YES in S21; timing t1 in FIG. 10), the FPGA 123 regards this stop command as being the report of the stopping of the supply of power V and shifts the driving signal VSB_OFF from the inactive state to the active state (S22). Consequently, in addition to power V (power converted by the DDC 82), power VSB becomes a source of power VSB' supplied to the output terminal O2 (timing t2 in FIG. 10).

Subsequently, the FPGA 123 monitors signals input from the ADC 89 and waits for power VSB to be supplied via the NMOS 84 (S23). Detecting the supply of power VSB with the signal input from the ADC 89 (YES in S23; timing t3 in FIG. 10), the FPGA 123 shifts the driving signal V_TO_VSB_ON from the active state to the inactive state (S24). Then, the switching control by the FPGA 123 ends. Making the driving signal V_TO_VSB_ON inactive puts the NMOS 83 in a non-conducting state, with the result that power VSB' supplied to the output terminal O2, which has been supplied to by both power VSB and power V, becomes to be supplied by only power VSB (timing t4 in FIG. 10).

Even when the supply of power V stops, the aforementioned switching control by the FPGA 123 allows power VSB to be supplied to the management unit 110, with the result that the management unit 110 is always supplied with power. Unlike the casein the second embodiment, power supplying means such as the capacitor 29 does not need to be provided. Accordingly, the third embodiment is advantageous in terms of downsizing and cost reduction in comparison with the second embodiment.

In the third embodiment, the switching control directed to the case of the stopping of the supply of power V is performed in response to the input of a stop command from the management unit 110, and the switching control directed to the case of the starting of the supply of power V may be performed in response to an input of a command from the management unit 110. The management unit includes a function to control power activation and power deactivation of a non-resident power supply of the PSU. Accordingly, the PSU itself may be provided with a mechanism that allows power from the non-resident power supply to be supplied as power from a resident power supply, i.e., may be provided with a power switching apparatus, and the management unit may control the power switching apparatus.

Under a condition in which the management unit performs control, in the example of the configuration illustrated in FIG. 5, the power switching apparatus mounted on the PSU needs to include at least the switching elements 21 and 22 and connecting lines that connect the switching elements 21 and 22 to the output terminal O2. The application of the embodiment to the PSU may be achieved by mounting the power switching apparatus having such a configuration on the PSU 1 depicted in FIG. 1. When the power switching apparatus having such a configuration is mounted on the PSU 1, the management unit may control the ON/OFF of the switching elements 21 and 22 in addition to controlling power activation and power deactivation of the power conversion circuit 2, a non-resident power supply. An apparatus that is different from the management unit may control the ON/OFF of the switching elements 21 and 22.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power switching apparatus coupled to a data processing apparatus that gives instructions to a supply source for supplying power, comprising:
    a first input terminal to which first power is supplied at a first voltage;
    a second input terminal to which second power is supplied at a second voltage lower than the first voltage;
    a first output terminal configured to supply, to outside of the power switching apparatus, the first power supplied to the first input terminal;
    a second output terminal configured to supply output power to the outside;
    a first switch configured to manage a supply of the output power, obtained from the first input terminal, by the second output terminal;
    a second switch configured to manage a supply of the second power from the second input terminal to the second output terminal;
    a voltage monitor configured to monitor the second voltage of the second power supplied from the second input terminal to the second output terminal via the second switch; and
    a processor configured to manage the supply of the output power by the second output terminal using the first and second switches, wherein
    when the processor receives, from the data processing apparatus, a report of stopping the supply of the first power that was sent a predetermined time period before an instruction to the supply source to stop the supply of the first power has been given,
        the processor controls the second switch so as to start the supply of the second power from the second input terminal to the second output terminal as the output power, and
        after the second voltage monitored by the voltage monitor reaches a predetermined value, the processor controls the first switch so as to interrupt the supply of the output power from the first input terminal to the second output terminal.

2. The power switching apparatus according to claim 1, further comprising a power configured to detect the first power supplied to the first input terminal,
    wherein when the power detector indicates a first change from no supply of the first power to supply of the first power, the processor causes the output power to be obtained from the first power input at the first input terminal via the first switch and causes the second switch to interrupt the supply of the second power from the second input terminal to the second output terminal.

3. The power switching apparatus according to claim 2, further comprising a power configured to supply power to the second output terminal when a voltage applied to the second output terminal decreases,
    wherein when the power detector indicates a second change from the supplying of the first power to no supply of the first power, the processor causes the second power to be provided from the second input terminal to the second output terminal via the second switch.

4. A power supply system comprising:
    the power switching apparatus according to claim 1; and
    a power supply unit that includes
        a first power supply configured to supply the first power to the first input terminal, and
        a second power supply configured to supply the second power to the second input terminal.

5. A computer system, comprising
    at least one computer; and
    the power supply system according to claim 4,
    wherein the computer has supplied thereto the first power from the first output terminal of the power switching apparatus and the output power from the second output terminal of the power switching apparatus.

* * * * *